(12) United States Patent
Sannokyou

(10) Patent No.: US 10,662,104 B2
(45) Date of Patent: May 26, 2020

(54) METHOD FOR MANUFACTURING LENS ARRAY OPTICAL SYSTEM AND LENS ARRAY OPTICAL SYSTEM

(71) Applicant: KONICA MINOLTA, INC., Chiyoda-ku (JP)

(72) Inventor: Takashi Sannokyou, Hachioji (JP)

(73) Assignee: Konica Minolta, Inc., Tokyo (JP)

(*) Notice: Subject to any disclaimer, the term of this patent is extended or adjusted under 35 U.S.C. 154(b) by 263 days.

(21) Appl. No.: 15/111,139

(22) PCT Filed: Jan. 23, 2015

(86) PCT No.: PCT/JP2015/051872
§ 371 (c)(1),
(2) Date: Jul. 12, 2016

(87) PCT Pub. No.: WO2015/111708
PCT Pub. Date: Jul. 30, 2015

(65) Prior Publication Data
US 2016/0332904 A1    Nov. 17, 2016

(30) Foreign Application Priority Data

Jan. 24, 2014  (JP) ................................. 2014-011778

(51) Int. Cl.
*G02B 3/00* (2006.01)
*C03B 11/08* (2006.01)
(Continued)

(52) U.S. Cl.
CPC .............. *C03B 11/082* (2013.01); *C03B 7/14* (2013.01); *G02B 3/0031* (2013.01);
(Continued)

(58) Field of Classification Search
None
See application file for complete search history.

(56) References Cited

FOREIGN PATENT DOCUMENTS

CN         1576897        2/2005
JP         2003-004909    1/2003
(Continued)

OTHER PUBLICATIONS

Office Action dated Dec. 20, 2017 which issued in the corresponding Chinese Patent Application No. 201580005064.3.
(Continued)

*Primary Examiner* — Darryl J Collins
*Assistant Examiner* — Journey F Sumlar
(74) *Attorney, Agent, or Firm* — Cozen O'Connor

(57) ABSTRACT

Plurality of glass droplets are simultaneously dropped toward center of a regular polygon of each unit on a first transfer surface of a first forming die where a plurality of the units is regularly arranged along the same plane, taking, as one unit, three or more first optical transfer surfaces for forming a lens portion placed in such a manner as to overlap vertices of the regular polygon respectively. After the divided glass droplets flow on the first transfer surface, are connected to each other between adjacent units, and are formed into united glass, and before the united glass hardens completely, a second forming die including a plurality of second optical transfer surfaces corresponding respectively to the plurality of first optical transfer surfaces is pressed relatively against the united glass on the first forming die to form the united glass, and released from the dies.

21 Claims, 8 Drawing Sheets

(51) Int. Cl.
*C03B 7/14* (2006.01)
*G02B 13/18* (2006.01)
*G02B 3/04* (2006.01)
*G02B 13/00* (2006.01)

(52) U.S. Cl.
CPC ......... *G02B 3/0056* (2013.01); *G02B 3/0062* (2013.01); *G02B 3/04* (2013.01); *G02B 13/0085* (2013.01); *G02B 13/18* (2013.01); *C03B 2215/414* (2013.01); *C03B 2215/46* (2013.01); *Y02P 40/57* (2015.11)

(56) References Cited

FOREIGN PATENT DOCUMENTS

| | | |
|---|---|---|
| JP | 2003-202411 | 7/2003 |
| JP | 2005-346021 | 12/2005 |
| JP | 2010-070429 | 4/2010 |
| JP | 3160406 | 6/2010 |
| JP | 2011-001177 | 1/2011 |
| JP | 2011-016699 | 1/2011 |
| JP | 2011-081354 | 4/2011 |
| JP | 2012-070431 | 4/2012 |
| JP | 2014211623 A | * 11/2014 |
| WO | WO 2012/036277 | 3/2012 |
| WO | WO 2012/176900 | 12/2012 |
| WO | WO 2013/024891 | 2/2013 |

OTHER PUBLICATIONS

Office Action dated Nov. 20, 2018 issued in the corresponding Chinese Patent Application No. 201580005064.3.
Office Action dated Aug. 30, 2018 issued in the corresponding Japanese Patent Application No. 2015-559135.

* cited by examiner

METHOD FOR MANUFACTURING LENS ARRAY OPTICAL SYSTEM AND LENS ARRAY OPTICAL SYSTEM

RELATED APPLICATIONS

This is a U.S. National Phase Application under 35 USC 371 of International Application PCT/JP2015/051872 filed on Jan. 23, 2015.

This application claims the priority of Japanese application no. 2014-011778 filed Jan. 24, 2014 the entire content of which is hereby incorporated by reference.

TECHNICAL FIELD

The present invention relates to a method for manufacturing a glass lens array optical system and a lens array optical system.

BACKGROUND ART

A lens array optical system including a plurality of lens portions is used for an imaging lens for a compound-eye imaging apparatus, a secondary image forming lens in an autofocus module of a single-lens reflex camera, an illumination lens in a semiconductor exposure apparatus, a condenser lens in a liquid crystal projector panel, and the like. The lens array optical system can be manufactured at low cost with optical plastic having high processability. However, the optical plastic not only has a high thermal expansion coefficient bus also is inferior in durability and light transparency, and accordingly is not suitable to be used stably on a high-temperature or high-humidity severe condition. Therefore, optical glass that has a low thermal expansion coefficient and is superior in durability under high temperature or high humidity is required to be used for the lens array optical system in order to enable stable use in various environments.

As a method for manufacturing a lens array optical system made of optical glass having multiple spherical or aspheric lenses, a method is proposed in which preforms made of glass with a larger curvature than a concave curvature of a forming die are placed, one by one, in transfer portions and are hot stamped (refer to Patent Literature 1). An excess of the preforms over the volumes of cavities for forming optical surfaces of the multiple lenses flows into junctions of the cavities and are integrally fused. However, there is a problem with the method of Patent Literature 1 that it takes much time and trouble to place the preforms on the optical transfer surfaces on the die. Moreover, air may remain in the junction (fused portion or joint) due to variations in the preforms to result in a reduction in the strength of the junction of the preforms. Moreover, there is also a problem that as the number of lens portions increases, the forming process becomes more difficult, and accordingly it becomes impossible to obtain a lens array having an intended optical surface shape.

Moreover, as another method for manufacturing a lens array optical system, a method is also proposed which does not use a die, supplies a liquid material to a substrate where a plurality of through-holes is formed, and forms a plurality of lenses on the substrate (refer to Patent Literature 2). However, there is a problem with the method of Patent Literature 2 that it is difficult to form an optical surface of the lens into an aspheric shape so that it is not possible to appropriately design the optical surface of the lens portion and optically correct various aberrations.

Moreover, as another method for manufacturing an optical glass lens array optical system, the drop method is known which forms a lens by dropping molten glass into a die. The drop method has few constraints on the shape of an optical surface since the forming process is performed in a state where the viscosity of the glass is relatively low. Moreover, a reduction in the occurrence of forming failure ascribable to the fluidity of a material can be expected. As the method for manufacturing a lens array by the drop method, Patent Literature 3 describes a method for manufacturing a lens array having 2×2 lens portions by dropping a glass drop on the center of one of dies having 2×2 optical transfer surfaces and pressing it with the other die. However, Patent Literature 3 does not describe the production of a lens array having lens portions more than 2×2, such as 4×4 or 5×5, in a lattice form. If an attempt is made to obtain a lens array having 4×4 lens portions by dropping a glass drop on a center portion of, for example, 4×4 optical transfer surfaces in accordance with the manufacturing method described in Patent Literature 3, an optical transfer surface that has been insufficiently filled with the glass may be produced as described below. Moreover, in Patent Literature 3, a projection is provided to change the flow of the glass drop to make adjustments such that the glass drop flows along the transfer surface of an optical surface near its edge side close to the projection, the edge side having a large inclination angle. Accordingly, an attempt is made to transfer the optical surface with high accuracy. However, there are problems that the manufacturing cost may increase if a glass projection is provided to the die as a preliminary process, and the die processing cost is high and the life of the die is influenced if the projection is formed upon die processing. If an attempt is made to drop a plurality of glass drops individually and respectively onto the optical transfer surfaces, forming failure may be invited, or gas entrainment may occur upon reaching the die, due to time differences in die arrival timings among the glass drops. Moreover, a problem also arises in which it becomes difficult to perform a forming process by pressing to a desired thickness since it becomes easy to become cold and harden as the result of a reduction in the volumes of the individual glass drops.

CITATION LIST

Patent Literature

Patent Literature 1: JP 2010-1177 A
Patent Literature 2: JP 2003-4909 A
Patent Literature 3: WO 2012/36277 A

SUMMARY OF INVENTION

An object of the present invention is to provide a method for manufacturing a lens array optical system that has a simple manufacturing process and can obtain a glass lens array optical system with high accuracy.

Moreover, an object of the present invention is to provide a lens array optical system that has high accuracy and has a configuration advantageous for ghost reduction.

In order to solve the above problems, the method for manufacturing a lens array optical system according to the present invention includes: simultaneously dropping divided glass droplets obtained by dividing drop-shaped molten glass into a plurality of droplets toward a center portion of a regular polygon of each unit on a first transfer surface of a first forming die where a plurality of the units is regularly arranged along the same plane, taking, as one unit, three or more first optical transfer surfaces for forming a lens portion placed in such a manner as to overlap vertices of the regular polygon respectively; after the divided glass droplets flow on the first transfer surface, are connected to each other between adjacent units, and are formed into united glass, and before the united glass hardens completely, pressing a second forming die including a plurality of second optical transfer surfaces corresponding respectively to the plurality of first optical transfer surfaces, relatively against the united glass on the first forming die to form the united glass; and obtaining a lens array including an integral glass part having a plurality of lens portions by releasing the lens array from the first and second forming dies. The regular polygon here is not technically limited to a regular polygon and also includes a case where the sides and interior angles are slightly unequal compared to the regular polygon.

In the method for manufacturing a lens array optical system, the drop-shaped molten glass is separated in accordance with the number of the units on the first forming die to form the divided glass droplets, which are unified again as united glass on the forming die. Then, the united glass is pressed by the forming die. Consequently, optical surfaces of the multiple lens portions can be formed with high accuracy but in a simple manufacturing process. Accordingly, the lens array exhibiting excellent optical properties can be manufactured.

A lens array optical system according to the present invention includes: an integral glass part having a plurality of lens portions and two principal surfaces; a plurality of units arranged regularly along the same plane, taking, as one unit, three or more lens portions placed in such a manner as to overlap vertices of a regular polygon respectively; and a groove portion on one of the principal surfaces between a pair of adjacent units among the plurality of units.

The lens array optical system includes the groove portion corresponding to a boundary between units to enable a reduction in ghosts reflected between optical surfaces of the lens portions.

BRIEF DESCRIPTION OF DRAWINGS

FIG. 1B is a cross-sectional view of the lens array optical system and the like.

DESCRIPTION OF EMBODIMENTS

First Embodiment

Figure 1A:
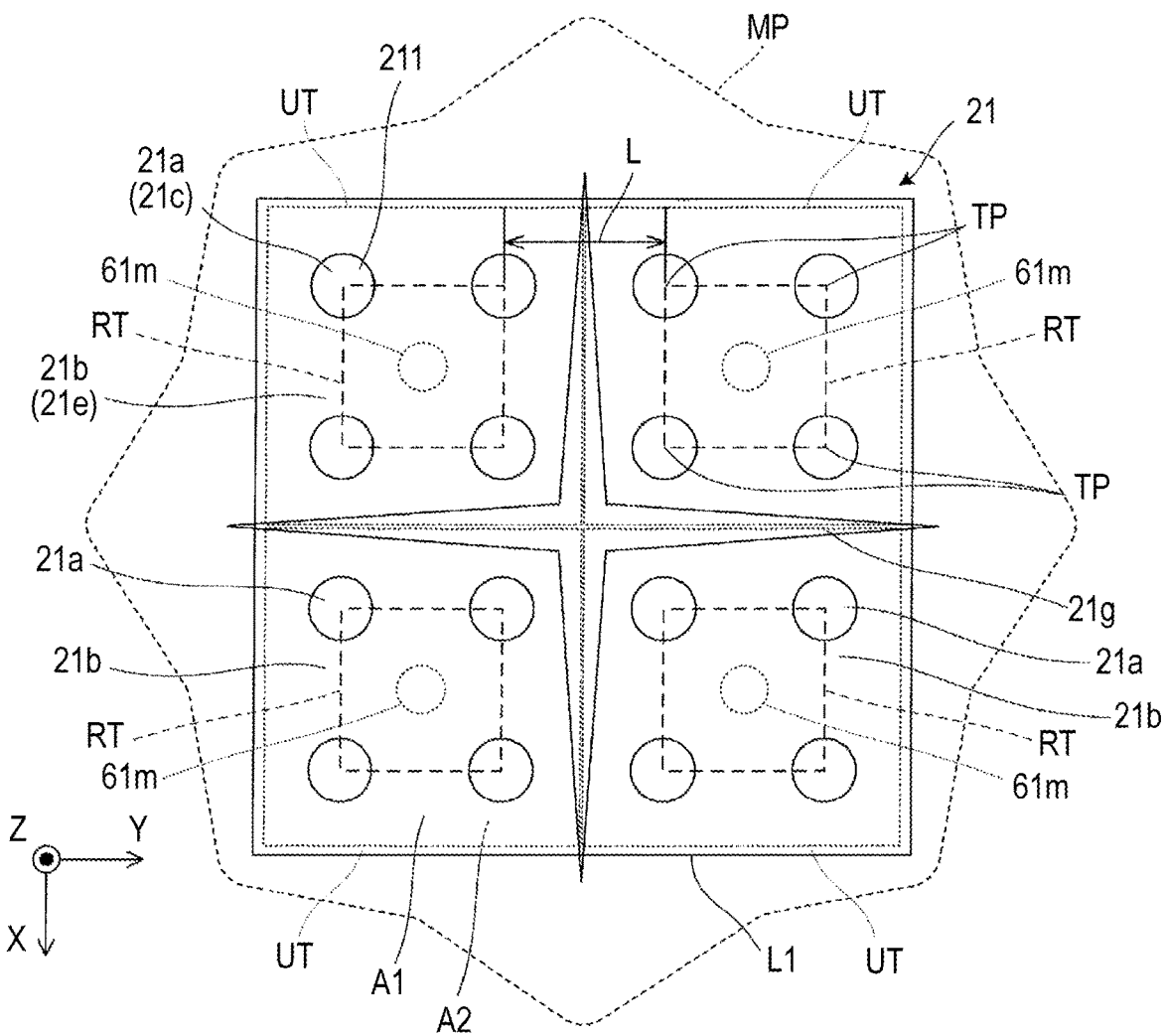
FIG. 1A is a plan view explaining a first lens array of a lens array optical system according to a first embodiment.

A method for manufacturing a lens array optical system, a lens array optical system manufactured by the manufacturing method, and a compound-eye imaging apparatus using the lens array optical system according to a first embodiment of the present invention are described with reference to FIGS. 1A and 1B, and the like.

Firstly, an imaging apparatus 100 mounted with a lens array optical system 20 is described. As illustrated in FIG. 1B, the imaging apparatus 100 is a compound-eye imaging apparatus that captures a plurality of images with a plurality of lens portions formed in the lens array optical system 20, and reconstructs one image. The imaging apparatus 100 includes a holder 10, the lens array optical system 20, a rear aperture 30, an infrared cut filter 40, and an imaging device array 50.

The holder 10 is for accommodating and holding the lens array optical system 20, the rear aperture 30, the infrared cut filter 40, and the imaging device array 50. A recess 11a having a plurality of steps T1, T2, and T3 is formed in the holder 10. The lens array optical system 20, the rear aperture 30, the infrared cut filter 40, and the imaging device array 50 are sequentially set in the recess 11a. The positions of the members 20, 30, 40, and 50 are determined directly or indirectly by the steps T1, T2, and T3 of the recess 11a. Circular opening portions 12 are formed in the holder 10 at positions of lattice points corresponding to a plurality of optical surfaces of the lens array optical system 20. The holder 10 is made of light-blocking resin, for example, liquid crystal polymer (LCP) or polyphthalamide (PPA) that includes a coloring agent such as a black pigment.

The lens array optical system 20 includes a first lens array 21 and a second lens array 22. The first and second lens arrays 21 and 22 are stacked in an optical axis OA direction. The lens array optical system 20 has a function of forming an image of a subject on an imaging surface I of the imaging device array 50. In the embodiment, the optical axis OA is an optical axis of each lens portion in the lens array. All the optical axes OA of the lenses are parallel.

Figure 1B:
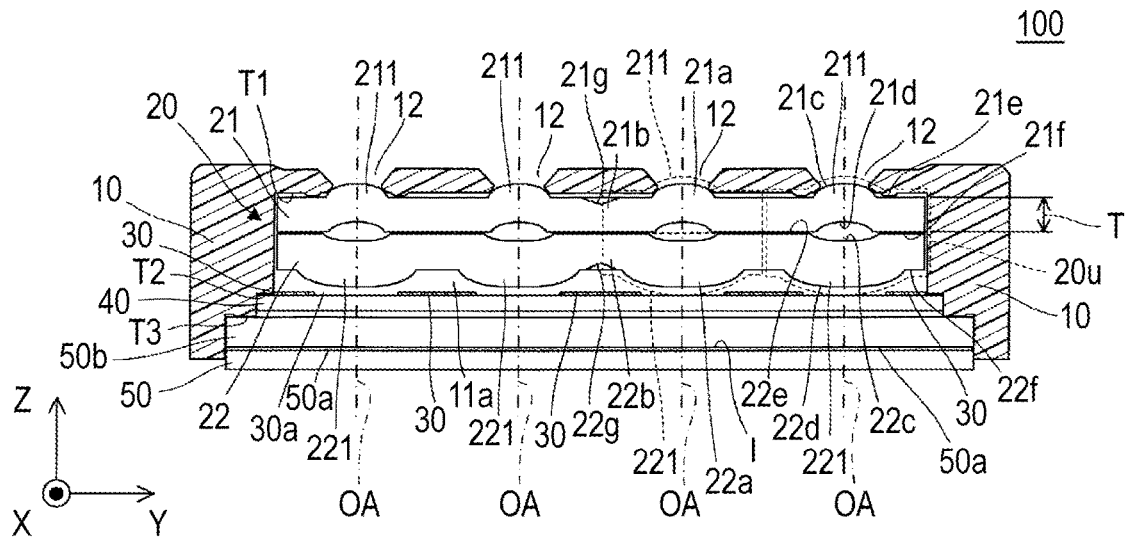

As illustrated in FIGS. 1A and 1B, the first lens array 21 of the lens array optical system 20 is placed on a side closest to an object in the imaging apparatus 100. The first lens array 21 includes a plurality of first lens portions 211 that is arranged two-dimensionally in a direction perpendicular to the optical axis OA. The first lens array 21 has a square or rectangular outer shape. The lens array optical system 20 can be a cutout cut out of a glass formed part MP formed by a forming apparatus 200 described below along, for example, a solid line L1. The first lens portions 211 of the first lens array 21 are integrally formed in a linked manner. Specifically, the first lens array 21 is an arrangement of the multiple first lens portions 211 each having a pair of a first lens body portion 21a and a first flange portion 21b integrated around the first lens body portion 21a. In the embodiment, the first lens body portions 21a are each placed such that a vertex TP of a square RT being one of regular polygons indicated by a broken line coincides with the optical axis. Four first lens portions 211 overlapping one square RT serve as one unit UT. In the first lens array 21 illustrated in FIG. 1A, four units UT are regularly arranged along the same plane. The first flange portions 21b between adjacent first lens portions 211 are integrated. The first lens body portion 21a includes a convex-shaped, aspheric first optical surface 21c on an object side, and a concave-shaped, aspheric second optical surface 21d on an image side. The first flange portion 21b includes a flat first flange surface 21e that extends around the first optical surface 21c, and a flat second flange surface 21f that extends around the second optical surface 21d. The first and second flange surfaces 21e and 21f are placed parallel to an X-Y plane perpendicular to the optical axis OA. The first optical surface 21c and the first flange surface 21e constitute an object-side principal surface A1 of the first lens array 21. The second optical surface 21d and the second flange surface 21f constitute an image-side principal surface A2 of the first lens array 21.

A groove portion 21g corresponding to a boundary between a pair of adjacent units UT is formed on the object-side principal surface A1. In other words, the groove portion 21g is placed on the object side of the lens array optical system 20. Consequently, light that enters the first lens array 21 from the object side, is reflected from the image-side principal surface A2, and attempts to propagate through the first lens array 21 while repeating total reflection between the two principal surfaces A1 and A2 is guided to the outside of the first lens array 21 by the groove portion 21g. Accordingly, the occurrence of ghosting can be effectively prevented. The maximum width of the groove portion 21g in an X or Y direction is preferable to be equal to or more than 0.3 times and equal to or less than 0.7 times a distance L between a pair of adjacent first lens portions 211 across the groove portion 21g. Moreover, the maximum depth of the groove portion 21g in a Z direction is preferable to be equal to or more than 1/50 and equal to or less than 1/5 of a thickness T of the first flange portion 21b between a pair of adjacent first lens portions 211 not across the groove portion 21g. The maximum width of the groove portion 21g is set within the above range, and the maximum depth of the groove portion 21g is set within the above range. Accordingly, the first lens array 21 is maintained with desired strength while ghost reduction can be promoted.

The second lens array 22 of the lens array optical system 20 is placed on a side closest to the image in the imaging apparatus 100. The basic structure of the second lens array 22 is substantially similar to the structure of the first lens array 21. A description is given omitting the descriptions of similar parts as appropriate. The second lens array 22 includes a plurality of second lens portions 221 that are arranged two-dimensionally in the direction perpendicular to the optical axis OA as in the first lens array 21. Second lens body portions 22a of the second lens portions 221 are also placed respectively at the vertices of squares as with the first lens body portions 21a. Four second lens portions 221 overlapping one square area serve as one unit. The second lens portion 221 includes the second lens body portion 22a and a second flange portion 22b integrated around the second lens body portion 22a. The second flange portions 22b between adjacent second lens portions 221 are integrated. The second lens body portion 22a includes a concave-shaped, aspheric third optical surface 22c on the object side, and a convex-shaped, aspheric fourth optical surface 22d on the image side. The second flange portion 22b includes a flat third flange surface 22e that extends around the third optical surface 22c, and a flat fourth flange surface 22f that extends around the fourth optical surface 22d. The third and fourth flange surfaces 22e and 22f are placed parallel to the X-Y plane perpendicular to the optical axis OA. The second lens portion 221, together with the first lens portion 211, has a function as an imaging lens 20u. The third optical surface 22c and the third flange surface 22e constitute an object-side principal surface of the second lens array 22. The fourth optical surface 22d and the fourth flange surface 22f constitute an image-side principal surface of the second lens array 22.

A groove portion 22g is formed between a pair of adjacent units on the second flange surface 22e side of the second lens array 22. In other words, the groove portion 22g is placed on the first lens array 21 side or image side of the lens array optical system 20. The dimensions (maximum width, maximum depth, and the like) of the groove portion 22g are similar to those of the groove portion 21g of the first lens array 21.

The first and second lens arrays 21 and 22 are formed by glass press forming, which is described in details below.

The rear aperture 30 is a plate-shaped member whose outer shape is square or rectangular, and is provided between the lens array optical system 20 and the infrared cut filter 40. A square or rectangular opening portion 30a is formed in the rear aperture 30, at a position corresponding to the first and second lens body portions 21a and 22a of the first and second lens arrays 21 and 22. The rear aperture 30 blocks stray light incident on the imaging device array 50. The rear aperture 30 may be formed by printing and the like on the infrared cut filter 40.

The infrared cut filter 40 is a square or rectangular plate-shaped member, and is provided between the rear aperture 30 and the imaging device array 50. The infrared cut filter 40 has a function of reflecting infrared radiation.

The imaging device array 50 detects a subject image formed by the first and second lens portions 211 and 221 of the first and second lens arrays 21 and 22. An imaging unit 50a including imaging devices that are arranged two-dimensionally in the direction perpendicular to the optical axis OA is incorporated in the imaging device array 50. Moreover, a transparent parallel flat plate 50b is placed and fixed on the lens array optical system 20 side of the imaging device array 50 in such a manner as to cover the imaging device array 50 and the like. The imaging unit 50a is a sensor chip including a solid state imaging device array. A photoelectric conversion unit (not illustrated) of the imaging unit 50a includes a CCD or CMOS, photoelectrically converts incident light for each of R, G, and B, and outputs an analog signal. The surface of the photoelectric conversion unit as a light receiving unit is the imaging surface (projected surface) I. The imaging device array 50 is fixed by an unillustrated wiring board. The wiring board receives the supply of a voltage or signal for driving the imaging unit 50a from an external circuit, and outputs a detection signal to the external circuit.

The forming apparatus 200 for manufacturing the first and second lens arrays 21 and 22, which constitute the lens array optical system 20, is described below.

Figure 2A:
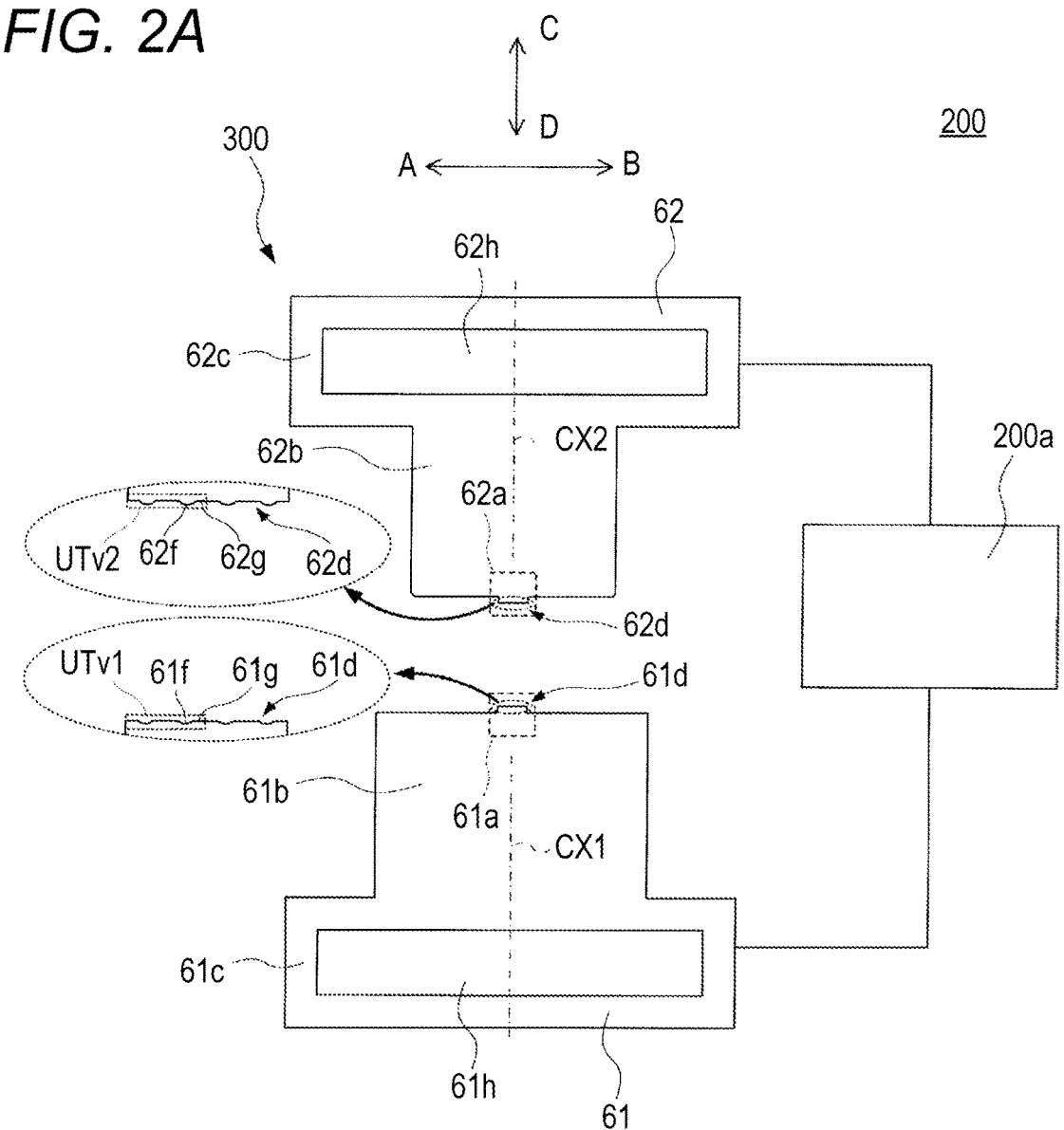
FIG. 2A is a diagram explaining a forming apparatus that is used for a method for manufacturing a lens array optical system according to the first embodiment.

As illustrated in FIG. 2A, the forming apparatus 200 incorporated with a forming die 300 is an apparatus for press forming in which glass being a raw material is melted to be pressed directly. The forming apparatus 200 further includes a control drive apparatus 200a for moving to the forming die 300 and performing opening and closing operations and the like upon manufacture of the first and second lens arrays 21 and 22, and a glass drop forming apparatus 200b (refer to, for example, FIG. 3A), in addition to the forming die 300 that is a main member. A method for manufacturing the second lens array 22 is similar to a method for manufacturing the first lens array 21. Accordingly, the first lens array 21 is mainly described below.

The forming die 300 includes a first forming die 61 on a fixed side and a second forming die 62 on a movable side. Upon forming, the first forming die 61 is kept in a fixed state, the second forming die 62 moves in such a manner as to face the first forming die 61, and accordingly both dies 61 and 62 are closed in such a manner as to face each other.

Firstly, the first forming die 61 is described with reference to FIGS. 2A and 2B. The first forming die 61 includes a die body 61a, a support unit 61b, and a heater unit 61c. The die body 61a of the first forming die 61 is cylindrical, and includes a first transfer surface 61d. The first transfer surface 61d includes a plurality of first optical transfer surfaces 61f for forming the first optical surfaces 21c of the first lens array 21, and a first flange transfer surface 61g for forming the first flange surfaces 21e. The first optical transfer surface 61f corresponds to the position of the first lens body portion 21a of the first lens array 21, and is placed such that its center coincides with the vertex TP of the square RT indicated by a broken line. Four first optical transfer surfaces 61f overlapping one square RT serve as one unit and constitute one first unit transfer surface UTv1 together with the first flange transfer surface 61g surrounding the four first optical transfer surfaces 61f. The first unit transfer surfaces UTv1 are arranged in a lattice or matrix form. Although the details are described below, divided glass droplets K (refer to FIG. 3A) that are dropped onto the first transfer surface 61d are drop-shaped molten glass divided into a plurality of droplets. Drop positions 61m of the divided glass droplets K are center portions of the first unit transfer surfaces UTv1 respectively, and are also arranged in a lattice or matrix form. The first flange transfer surface 61g extends from an outer edge of each first optical transfer surface 61f toward another first optical transfer surface 61f or the periphery of the first transfer surface 61d, as a die surface excluding the plurality of first optical transfer surfaces 61f that are arranged two-dimensionally on the first transfer surface 61d. The unit transfer surfaces UTv1 are arranged in a lattice form (specifically, placed at points of a planar lattice). Accordingly, the plurality of first optical transfer surfaces 61f are arranged in a lattice form and the drop positions of the divided glass droplets K are also arranged in a lattice form. Hence, it becomes easy to make the spread of the divided glass droplets K uniform over the first optical transfer surfaces 61f. Moreover, the first optical transfer surfaces 61f are arranged in a lattice form. Accordingly, if the divided glass droplet K is dropped on the center of one unit transfer surface UTv1, the distances to the first optical transfer surfaces 61f are equal. Hence, the behavior of the molten glass is similar on the first optical transfer surfaces 61f. Therefore, it is possible to perform the forming process stably with little unevenness in quality between the lens portions 211. Especially, the first optical transfer surfaces 61f are arranged in a rectangular lattice form. Accordingly, the lens array optical system 20 in which the lens portions 211 are placed in a matrix form can be produced with high accuracy.

An electric heater 61h for heating the die body 61a appropriately is incorporated into the heater unit 61c provided to a basal portion of the support unit 61b of the first forming die 61.

Next, the second forming die 62 is described. As illustrated in FIG. 2A, the second forming die 62 includes a die body 62a, a support unit 62b, and a heater unit 62c.

The die body 62a of the second forming die 62 is cylindrical and includes a second transfer surface 62d. The second transfer surface 62d includes a plurality of second optical transfer surfaces 62f for forming the second optical surfaces 22c of the first lens array 21, and a second flange transfer surface 62g for forming the second flange surfaces 22e. The second optical transfer surface 62f corresponds in position to the first lens body portion 21a of the first lens array 21, and is placed such that its center coincides with a vertex of a square as with the first optical transfer surface 61f. Four second optical transfer surfaces 62f overlapping one square serve as one unit and constitute one second unit transfer surface UTv2 together with the second flange transfer surface 62g surrounding the four second optical transfer surfaces 62f. The second optical transfer surfaces 62f are arranged in a lattice form as in the first optical transfer surfaces 61f of FIG. 2B.

An electric heater 62h for heating the die body 62a appropriately is incorporated into the heater unit 62c provided to a basal portion of the support unit 62b of the second forming die 62.

The second forming die 62 and the first forming die 61 are placed coaxially at the second transfer surface 62d of the second forming die 62 and the first transfer surface 61d of the first forming die 61 upon press forming, and maintain an appropriate positional relationship by, for example, separating from each other with a predetermined spacing upon pressing and cooling.

The control drive apparatus 200a controls the entire forming apparatus 200 incorporated with the forming die 300, for example, the control of power supply to the electric heaters 61h and 62h, and the closing and opening operations of the first forming die 61 and the second forming die 62, in order to form the first lens array 21 with the forming die 300. The second forming die 62 driven by the control drive apparatus 200a can move in a horizontal A-B direction and also can move in a vertical C-D direction as illustrated in FIG. 2A. For example, when both dies 61 and 62 are aligned and closed, the second forming die 62 is moved to a position above the first forming die 61 first to align axes CX1 and CX2 of both dies 61 and 62, which in turn aligns the second optical transfer surface 62f at the top and the first optical transfer surface 61f at the bottom, and the second forming die 62 is lowered to be pressed against the first forming die 61 with a predetermined force.

Figure 3A:
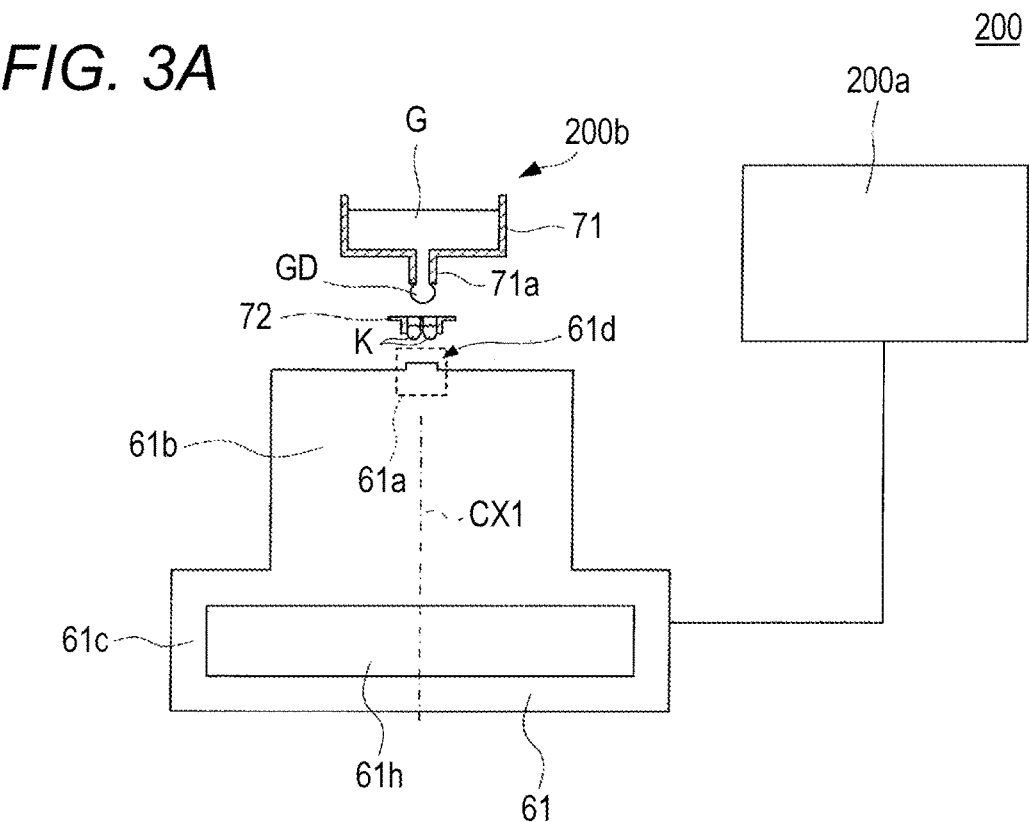
FIG. 3A is another diagram explaining the forming apparatus that is used for the method for manufacturing a lens array optical system according to the first embodiment.

As illustrated in FIG. 3A, the glass drop forming apparatus 200b includes a raw material supply unit 71 and a dividing member 72. The raw material supply unit 71 and the dividing member 72 are heated by an unillustrated heater to make glass in the raw material supply unit 71 molten, and keep the glass passing through the dividing member 72 molten. The control drive apparatus 200a controls the raw material supply unit 71 over movement and the drop timing of molten glass G.

The raw material supply unit 71 stores the molten glass G melted in an unillustrated crucible or the like. The raw material supply unit 71 is a portion for discharging the molten glass G from a nozzle 71a at a predetermined timing to drop a molten glass drop GD being the drop-shaped molten glass G and supply it to the dividing member 72.

Figure 3B:
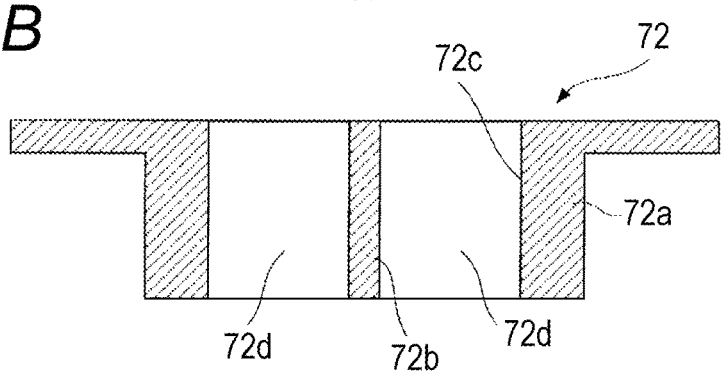
FIGS. 3B to 3D are cross-sectional views explaining a dividing member of the forming apparatus.
Figure 3C:
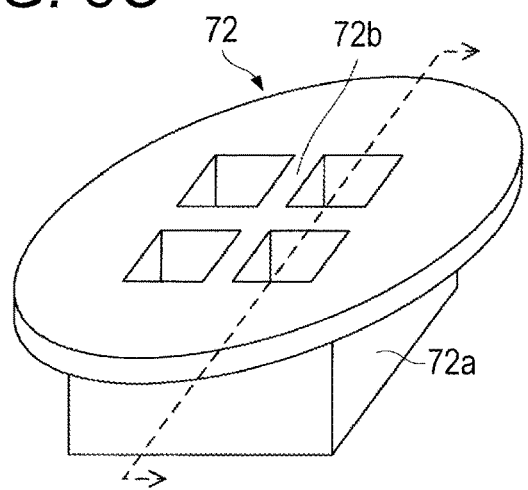
Figure 3D:
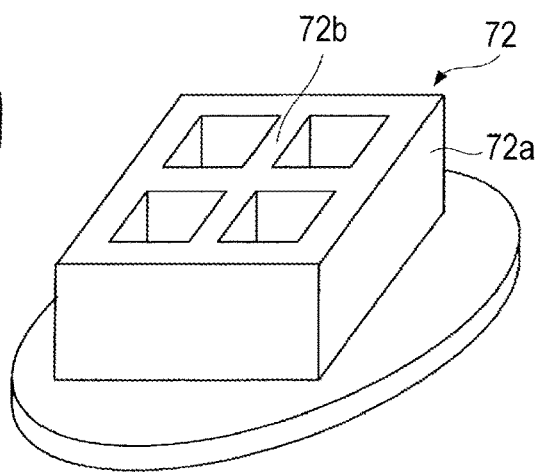

The dividing member 72 is for forming a plurality of divided glass droplets K from the single molten glass drop GD supplied from the raw material supply unit 71. The dividing member 72 is placed immediately below the nozzle 71a provided at the bottom of the raw material supply unit 71. As illustrated in FIGS. 3B to 3D, the dividing member 72 includes a body unit 72a and a partition plate 72b.

The body unit 72a of the dividing member 72 includes a through-hole 72c at a position facing the nozzle 71a of the raw material supply unit 71. The inner diameter of the through-hole 72c is substantially the same as or slightly smaller than the outer diameter of the molten glass drop GD that is dropped from the nozzle 71a of the raw material supply unit 71. The body unit 72a guides the molten glass drop GD supplied from the raw material supply unit 71 to the through-hole 72c and also prevents the flying of the molten glass drop GD.

The partition plate 72b is a member that splits the molten glass drop GD into the plurality of divided glass droplets K. The partition plate 72b is a member placed inside the body unit 72a, that is, in the through-hole 72c, the member having a cross-shaped cross section. The partition plate 72b can be assumed as a combination of four plate portions. The partition plate 72b and the body unit 72a may be an integrated part. A plurality of openings 72d is formed in the through-hole 72c by the partition plate 72b. These openings 72d correspond in number to the unit transfer surfaces UTv1 provided to the first forming die 61. In the embodiment, four units UT are provided. Accordingly, four openings 72d are provided. Moreover, the opening 72d is placed such that the formed divided glass droplet K is dropped on the center portion of the unit transfer surface UTv1. A shape connecting center portions of the four openings 72d and a shape connecting the center portions of the four unit transfer surfaces UTv1 are similar. Consequently, it becomes easy for the divided glass droplet K to be dropped in such a manner as to be laid over the center portion of the unit transfer surface UTv1. A metal or alloy with heat resistance such as SUS (stainless steel) can be used as the material of the partition plate 72b. It is preferable to treat the surface of the partition plate 72b such as Cr coating or Pt—Ir coating. A coating layer is provided to enable the prevention of adhesion of glass to the partition plate 72b. The thickness of the plate portion of the partition plate 72b can be set to, for example, approximately one mm.

As described above, the molten glass G is supplied as the molten glass drop GD from the nozzle 71a of the raw material supply unit 71 to the body unit 72a of the dividing member 72, is divided when passing through the partition plate 72b, is dropped individually from outlets of the dividing member 72, and becomes the plurality of divided glass droplets K. The dividing member 72 is used to enable control over the size and number of divided glass droplets K in accordance with the openings of the dividing member 72. The drop positions of the divided glass droplets K can be adjusted by the thickness of the partition plate 72b.

A method for manufacturing the glass formed part MP including a plurality of the first lens arrays 21 with the forming die 300 illustrated in FIG. 2A and the like is described below with reference to FIGS. 4A to 4F and the like.

Figure 2B:
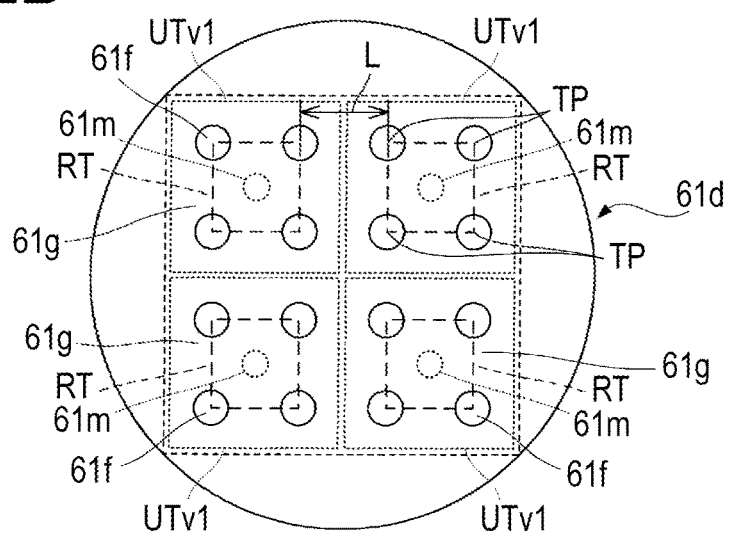
FIG. 2B is a plan view explaining a transfer surface of a first forming die of FIG. 1A.
Figure 4A:
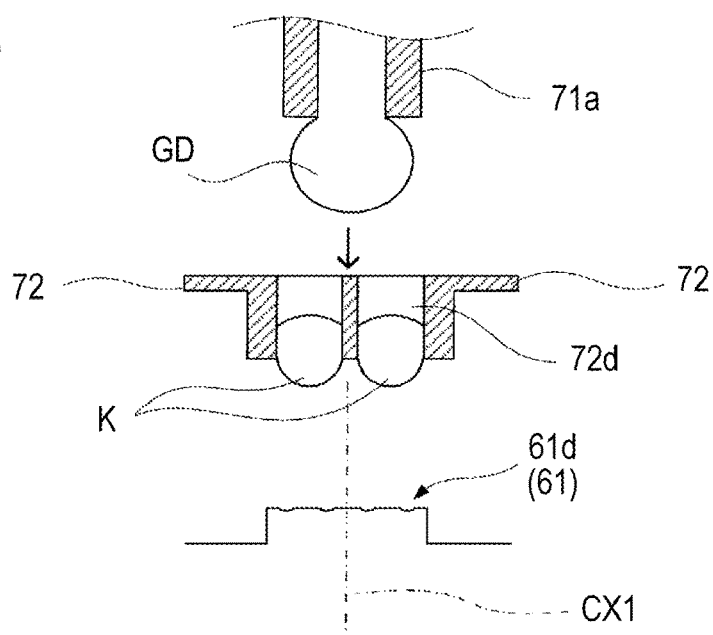
FIGS. 4A to 4F are cross-sectional views explaining a manufacturing process of a first lens array using the forming apparatus.

Firstly, as illustrated in FIGS. 3A and 4A, the dividing member 72 of the glass drop forming apparatus 200b is placed above the first forming die 61 such that the center of the partition plate 72b is aligned with a center portion of the first transfer surface 61d of the first forming die 61 (specifically, a center portion of all of the plurality of unit transfer surfaces UTv1 illustrated in FIG. 2B). The dividing member 72 receives the molten glass drop GD dropped from the nozzle 71a of the raw material supply unit 71 and causes the divided glass droplets K obtained by dividing the molten glass drop GD into a plurality of droplets to drop naturally onto the first transfer surface 61d from the openings 72d of the dividing member 72. The plurality of divided glass droplets K are simultaneously dropped toward the center portions (the drop positions 61m illustrated in FIG. 2B) of the squares of their corresponding unit transfer surfaces UTv1 (a drop step). At this point in time, prior to the drop of the molten glass G, the electric heater 61h heats the first transfer surface 61d to a temperature of an approximately glass-transition temperature of the molten glass drop GD for an optical device that is a raw material of the first lens array 21. All the divided glass droplets K have substantially equal volume to each other, and their total weight is a desired weight substantially equal to the volume of the glass formed part MP. Examples of raw material glass used for the molten glass G include phosphate glass. The glass drop forming apparatus 200b is withdrawn to a position that does not hinder the second forming die 62 from ascending and descending after the drop of the divided glass droplets K. Moreover, in terms of the timing to withdraw the dividing member 72, the earlier, the better.

Figure 4B:
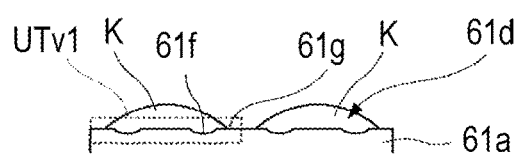
Figure 4C:
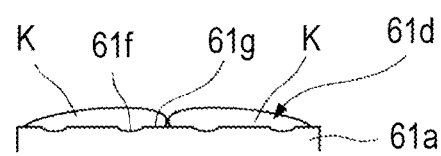
Figure 4D:
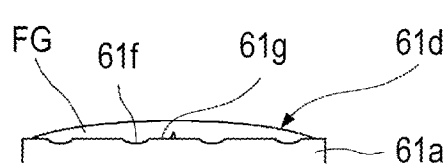
Figure 4E:
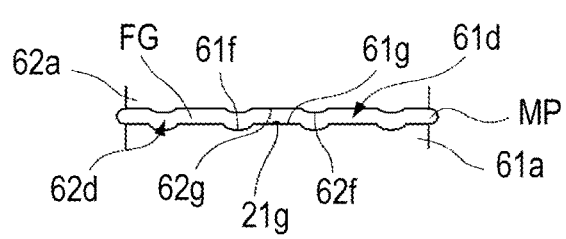

As illustrated in FIGS. 4B and 4C, after being dropped, the divided glass droplet K flows and extends over the first transfer surface 61d of each unit UT, and is filled in the first optical transfer surfaces 61f and the first flange transfer surface 61g. As illustrated in FIG. 4D, the divided glass droplets K dropped onto the unit transfer surfaces UTv1 are then connected to each other respectively between adjacent unit transfer surfaces UTv1 to become united glass FG. At this point in time, a cross-shaped space is created at a center portion of the united glass FG on the first transfer surface 61d side of the first forming die 61. The space serves as the above-mentioned groove portion 21g in the end. As illustrated in FIG. 4E, the second forming die 62 is pressed relatively against the united glass FG on the first forming die 61 to form the united glass FG before the united glass FG hardens completely and during the time while a pressure deformable temperature is kept (a forming step). At this point in time, the press is performed in a state where the second forming die 62 is moved to the position above the first forming die 61 to align the axes CX1 and CX2 of both dies 61 and 62, which in turn aligns the second optical transfer surface 62f at the top and the first optical transfer surface 61f at the bottom. The second forming die 62 is heated in advance to a temperature substantially equal to that of the first forming die 61.

Figure 4F:
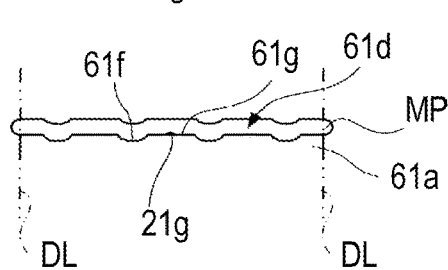

Next, the temperature of the united glass FG reduces gradually. Accordingly, the glass formed part MP including the first and second optical surfaces 21c and 21d and first and second flange surfaces 21e and 21f of the first lens array 21 is formed. After the glass formed part MP is sufficiently cooled, the application of pressure between the first forming die 61 and the second forming die 62 is released to raise the second forming die 62 as illustrated in FIG. 4F. Accordingly, the glass formed part MP is released to be removed from the die (a removal step).

After the removal step, the glass formed part MP is shaped into a square or rectangle by cutting away outer first flange portions 21b along a cutting-plane line DL (refer to FIG. 4F) by use of a dicer or the like to obtain such a first lens array 21 as illustrated in FIG. 1B and the like (a cutting step).

The second lens array 22 is also manufactured as with the first lens array 21. The first and second lens arrays 21 and 22 are then joined by adhesive in a state of being stacked such that the second optical surface 21d faces the third optical surface 22c. Consequently, the lens array optical system 20 illustrated in FIG. 1B and the like is formed. The lens array optical system 20 and the other members 30, 40, and 50 are then incorporated into the holder 10 to complete the imaging apparatus 100.

According to the method for manufacturing a lens array optical system, the molten glass drop GD is separated in accordance with the number of the unit transfer surfaces UTv1 of the first transfer surface 61d on the first forming die 61 to form the divided glass droplets K, which are dropped onto the first forming die 61. In other words, the molten glass drop GD is not supplied directly to the first forming die 61 but is caused to reach the first forming die 61 after the division. Therefore, each individual divided glass droplet K is reduced in volume compared with the molten glass drop GD so that an impact upon reaching the first forming die 61 is small, and the speed of the spread over the first forming die 61 is reduced. Accordingly, air bubble entrainment does not occur and the glass is filled and transferred along the first and second transfer surfaces 61d and 62d. Moreover, even if the amount of a sag of the first lens portion 211 to be obtained is large, and the first optical transfer surface 61f is deep, insufficient filling and transfer failure hardly occur. Moreover, one molten glass drop GD is dropped to generate the plurality of divided glass droplets K by the dividing member 72. Accordingly, the divided glass droplets K can be caused to reach the first forming die 61 substantially simultaneously. Therefore, forming failure is prevented which is ascribable to time differences in arrival timing at the first forming die 61 among the divided glass droplets K. Moreover, there is no need to place the divided glass droplets K on the optical transfer surfaces 61f respectively in time sequence. Accordingly, it is avoided that the divided glass droplets K become cold and harden before a press so that forming to a desired thickness cannot be performed. Furthermore, they are unified again as the united glass FG on the first forming die 61 and then pressed by the first and second forming dies 61 and 62. Accordingly, the transfer performance of the first to fourth optical surfaces 21c, 21d, 22c, and 22d of the first and second lens portions 211 and 221 can be made uniformly stable. Moreover, it becomes difficult that an interface of the united glass FG is generated inside and outside an area corresponding to each unit transfer surface UTv1 so that the occurrence of an internal defect and a crack in the first and second lens arrays 21 and 22 can be prevented. Accordingly, a reduction in strength can be prevented. Moreover, even if there are variations to some degree in the size of the glass supplied in a state where a glass drop is divided, since the divided glass droplets K are simultaneously dropped on the center portions of the unit transfer surfaces UTv1 and are unified into one as the united glass FG after the drop, as long as each divided glass droplet K has the volume equal to or more than an amount necessary to be filled in its corresponding first optical transfer surface 61f, the influence of the variations is resolved. Consequently, strict control over the drop amount becomes unnecessary. Moreover, the glass is unified on the first forming die 61 to increase the volume as the whole so that the heat of the glass is stored and the time before the glass becomes cold to the inside is extended. Consequently, the forming process can be achieved with stable accuracy avoiding situations such as that the lens portions 211 and 222 become too thin and that the forming process need to be performed under strict forming conditions, which in turn can increase the life of the die. Moreover, the divided glass droplet K is dropped at a position other than the first optical transfer surface 61f corresponding to the first optical surface 21c. Accordingly, it is possible to prevent the formation of a drop mark (a minute air trap) on the first optical transfer surface 61f and the like. In this manner, in the method for manufacturing a lens array optical system of the embodiment, the manufacturing process is simple. However, the optical surfaces 21c, 21d, 22c, and 22d of the lens portions 211 and 221 can be formed with high accuracy and the lens arrays 21 and 22 exhibiting excellent optical properties can be manufactured. The surfaces on the glass supply side (the surfaces on the first forming die 61 side, that is, the first and fourth flange surfaces 21e and 22f of the first and second lens arrays 21 and 22) have very shallow grooves formed into a cross shape at the portions where pieces of the glass are connected. They serve as the groove portions 21g and 22g described in FIG. 1. There is also no boundary at these groove portions 21g and 22g in the first and second lens arrays 21 and 22. There is no problem in part performance such as strength and striae.

As described above, a glass drop is caused to reach the first forming die 61 after its division. Accordingly, the speed of the spread over the first forming die 61 is reduced. Accordingly, the glass can be excellently filled in the first and second transfer surfaces 61d and 62d without providing, on the forming die, such a projection for changing the flow of the glass drop as described in Patent Literature 3 (that is, even if the center portion of the unit transfer surface UTv1 remains flat). However, if the filling performance is desired to be further improved, the projection may be formed at the center portion of the unit transfer surface UTv1.

Figure 5A:
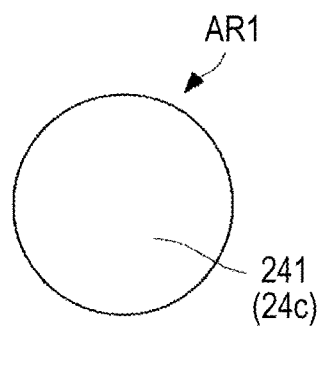
FIGS. 5A to 5D are diagrams explaining a lens array optical system of a comparative example.
Figure 5B:
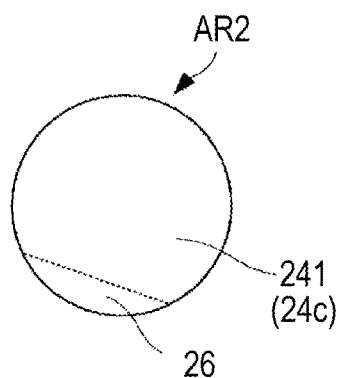
Figure 5C:
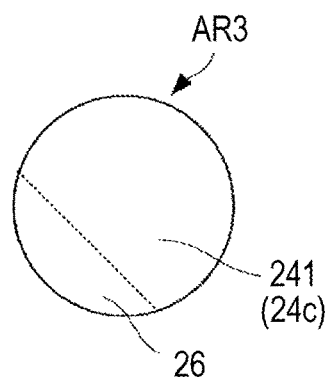
Figure 5D:
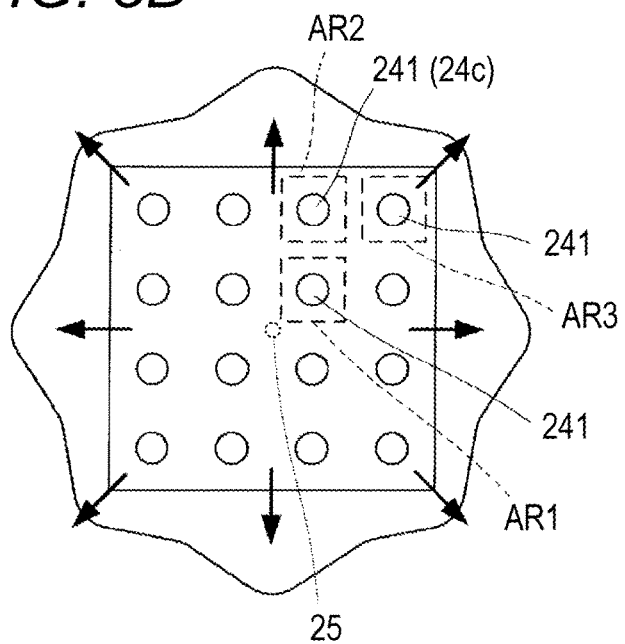

As illustrated in FIG. 5D, when lens portions 241 with a configuration where multiple optical surfaces 24c are placed on the same plane are manufactured by dropping one piece of molten glass, transfer failure due to the air remaining between the die and the glass supplied upon the drop becomes easy to occur depending on the position of a transfer surface corresponding to the optical surface 24c with respect to a drop center 25. For example, if one glass drop is dropped on the center of 4×4 optical transfer surfaces as illustrated in FIG. 5A, transfer failure does not occur in the lens portion 241 in an area AR1 that is closest to the drop center 25 (refer to FIG. 5D). However, as illustrated in FIGS. 5B and 5C, portions 26 where the transfer is not done to the inside of the transfer surface may remain in directions extending radially from the drop center 25 in the lens portions 241 in areas AR2 and AR3 that are distant from the drop center 25 (refer to FIG. 5D). In this case, the lens portion 241 of the area AR3 is farther from the drop center 25 than the lens portion 241 of the area AR2. Accordingly, the not-transferred portion 26 becomes larger in general.

Second Embodiment

A lens array optical system of a second embodiment according to the present invention is described below. The lens array optical system of the second embodiment is the modified lens array optical system of the first embodiment. Matters that are not especially described are similar to those of the first embodiment.

Figure 6:
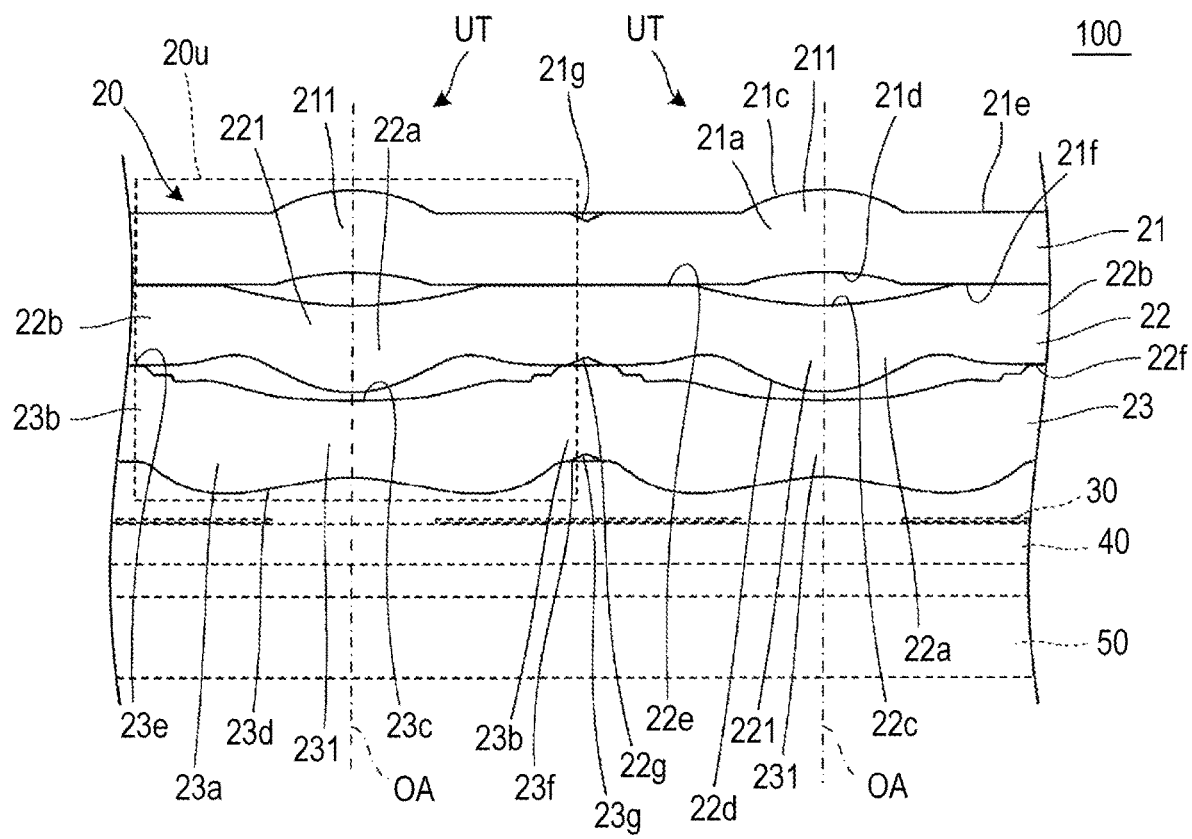
FIG. 6 is a cross-sectional view explaining a lens array optical system according to a second embodiment.

As illustrated in FIG. 6, the lens array optical system 20 includes the first and second lens arrays 21 and 22, and a third lens array 23.

The first lens array 21 of the lens array optical system 20 is placed on the side closest to the object in the imaging apparatus 100. The groove portion 21g is formed between a pair of adjacent units UT on the first flange surfaces 21e on the object-side principal surface of the first lens array 21. In other words, the groove portion 21g is placed on the object side of the lens array optical system 20.

The second lens array 22 is placed between the first lens array 21 and the third lens array 23. The groove portion 22g is formed between a pair of adjacent units on the fourth flange surface 22f side of the image-side principal surface of the second lens array 22. In other words, the groove portion 22g is placed on the principal surface facing the other lens array (the third lens array 23 in the embodiment). The groove portion 22g functions as an air bleeder on a junction surface between the second lens array 22 and the third lens array 23.

The third lens array 23 is placed on the side closest to the image in the imaging apparatus 100. The third lens array 23 includes a plurality of third lens portions 231 that are arranged two-dimensionally in the direction perpendicular to the optical axis OA as in the first lens array 21 and the like. Although the illustration is omitted, third lens body portions 23a are respectively placed at the vertices of a square as with the first lens body portions 21a. Four third lens portions 231 included in one square area serve as one unit. The third lens portion 231 includes the third lens body portion 23a and a third flange portion 23b integrated around the third lens body portion 23a. The third flange portions 23b of adjacent third lens portions 231 are integrated. The third lens body portion 23a includes a concave-shaped, aspheric fifth optical surface 23c on the object side, and a convex-shaped, aspheric sixth optical surface 23d on the image side. The third flange portion 23b includes a flat fifth flange surface 23e that extends around the fifth optical surface 23c, and a flat sixth flange surface 23f that extends around the sixth optical surface 23d. The fifth and sixth flange surfaces 23e and 23f are placed parallel to the X-Y plane perpendicular to the optical axis OA. The third lens portion 231, together with the first and second lens portions 211 and 221, has a function as the imaging lens 20u.

A groove portion 23g is formed between a pair of adjacent units on the sixth flange surface 23f side of an object-side principal surface of the third lens array 23. In other words, the groove portion 23g is placed on the image side of the lens array optical system 20.

Third Embodiment

A method for manufacturing a lens array optical system and a lens array optical system of a third embodiment according to the present invention is described below. The third embodiment is the modified first embodiment. Matters that are not especially described are similar to those of the first embodiment.

Figure 7A:
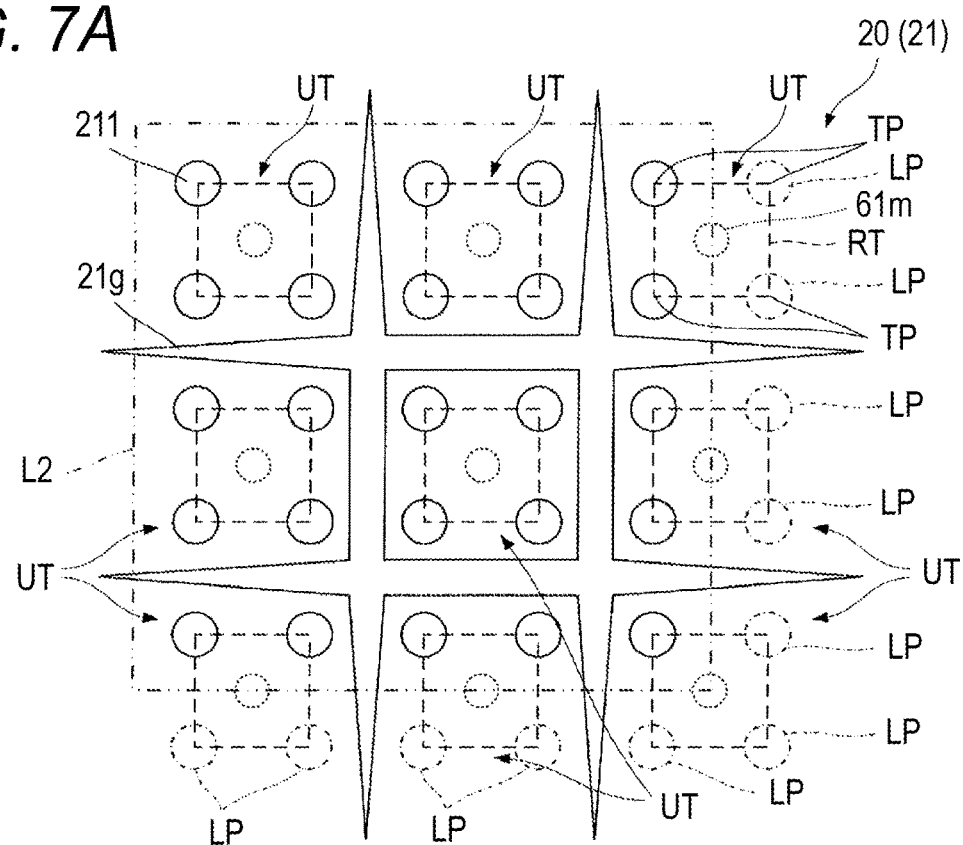
FIGS. 7A and 7B are cross-sectional views explaining a lens array optical system according to a third embodiment.
Figure 7B:
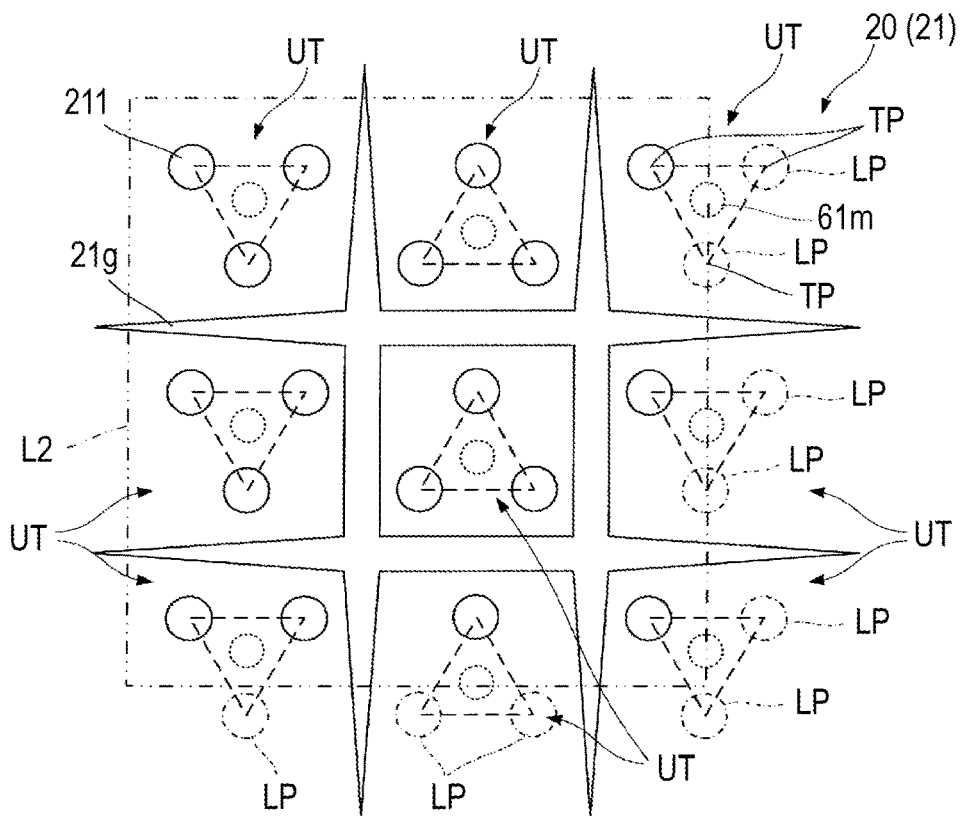

As illustrated in FIGS. 7A and 7B, a plurality of additional lens portions LP may be provided outside the plurality of units UT when the glass formed part MP including the first lens array 21 is formed. FIG. 7A illustrates an example where the forming process is performed with a forming die having 6×6 optical transfer surfaces that are arranged in a matrix form to obtain the first lens array 21 having 5×5 first lens portions 211 that are arranged in a matrix form. FIG. 7B illustrates an example where the forming process is performed with a forming die having 27 optical transfer surfaces that are arranged in a staggered manner to obtain the first lens array 21 having 18 first lens portions 211 that are arranged in a staggered manner. In this manner, at least one lens portion LP that is more than the required number is provided on the outermost periphery of the first lens array 21. Accordingly, the forming process becomes stable so that the first lens array 21 can be formed with high accuracy. After the lens portions more than the required number are formed, the lens portions LP may be removed in a downstream process where needed. As in the example of FIG. 7A, if it is desired to obtain the first lens array 21 having an odd number of first lens portions 211 in at least one of a column direction and a row direction, after 6×6 first lens portions 211 are formed, cutting is performed along the position of a chain double-dashed line L2. The lens portions LP on the outer side, that is, at least one lens portion located on the outermost periphery, are removed as throwaway lens portions. Accordingly, the first lens array 21 where 5×5 first lens portions 211 are placed can be produced. If cutting is performed only in the column direction or row direction, the first lens array 21 having 5×6 or 6×5 first lens portions 211 can also be produced. Moreover, as illustrated in FIG. 7B, also if three first lens portions 211 placed at the vertices of a regular triangle serve as one unit, a plurality of units is arranged, and 27 first lens portions 211 in total are arranged in a staggered manner, the first lens array 21 including 18 first lens portions 211 can be produced by cutting away and removing the lens portions LP on the outer side. In other words, the unnecessary lens portions LP on the outer side are cut away and removed after the forming process. Accordingly, the number of the first lens portions 211 in the column and/or row direction(s) can be adjusted from an even number to an odd number or vice versa. Moreover, it is possible to obtain the first lens array 21 including the first lens portions 211 placed in an arrangement that is difficult to be obtained only by the forming process. In the example illustrated in FIG. 7B, if the cutting plane line is made straight, when the lens portion LP overlaps the cutting plane line, cutting may be performed in such a manner as to divert the cutting plane line around the lens portion LP.

Fourth Embodiment

A method for manufacturing a lens array optical system of a fourth embodiment according to the present invention is described below. The method for manufacturing a lens array optical system of the fourth embodiment is the modified method for manufacturing a lens array optical system of the first embodiment. Matters that are not especially described are similar to those of the first embodiment.

Figure 8A:
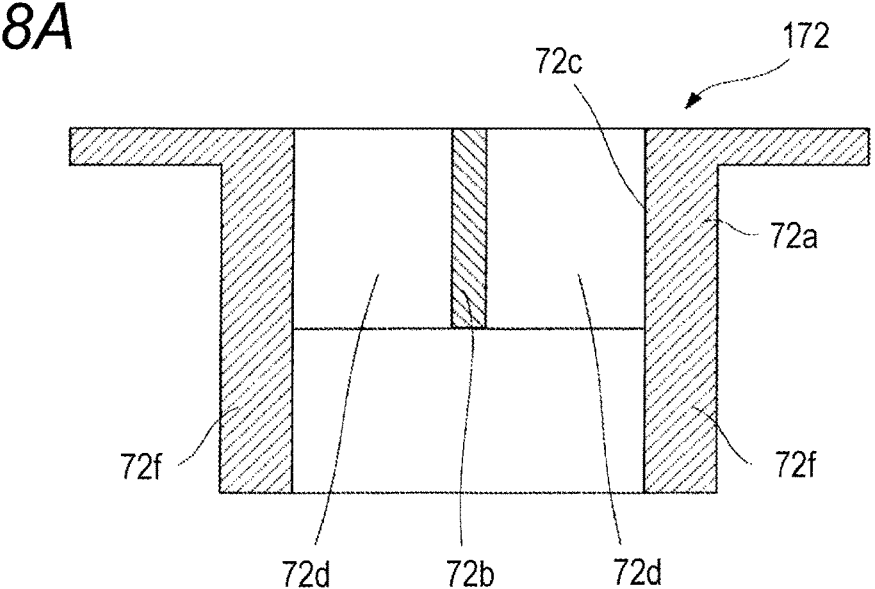
FIGS. 8A to 8C are diagrams explaining modifications of a dividing member of a forming apparatus that is used for a method for manufacturing a lens array optical system according to a fourth embodiment.
Figure 8B:
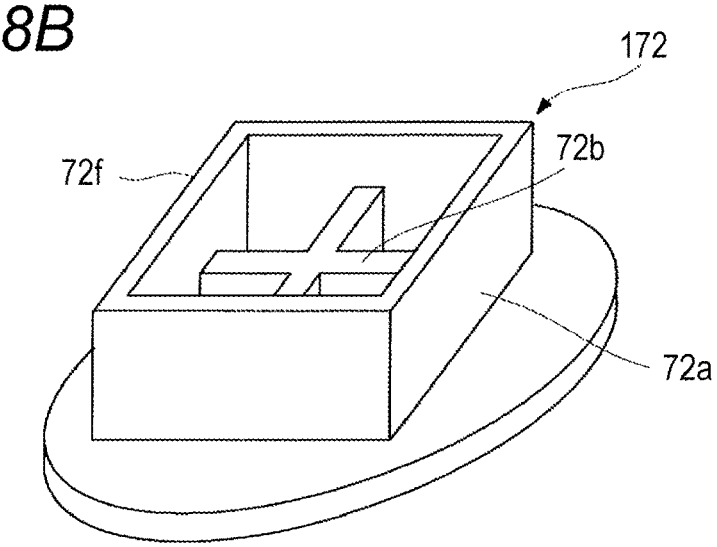

As illustrated in FIGS. 8A and 8B, a dividing member 172 includes an outer frame or outer frame unit 72f that is obtained by extending a lower end of the body unit 72a of the dividing member 72 illustrated in FIGS. 3B to 3D, and extends downward of lower ends of the partition plate 72b and the opening 72d in the vertical direction. In this case, it becomes easy to keep each of the plurality of the divided glass droplets K independent as one, in the outer frame unit 72f. Accordingly, it is possible to further reduce variations in the size and drop position of the divided glass droplet K.

Figure 8C:
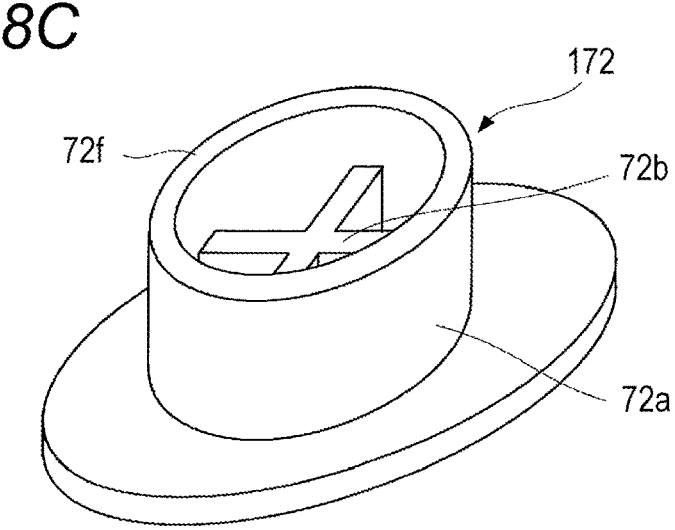

An external shape of the body forming a through-hole may be such a quadratic prism shape as illustrated in FIGS. 8A and 8B, and may be such a columnar shape as illustrated in FIG. 8C.

Moreover, both the lengths of the body unit 72a and the partition plate 72b may be increased to reduce variations in the size and drop position of the divided glass droplet K.

Up to this point the method for manufacturing a lens array optical system and the like according to the embodiments have been described. However, the method for manufacturing a lens array optical system and the like according to the present invention are not limited to those described above. For example, in the above embodiments, the shape, placement, number, and the like of the first lens portions 211 and the like of the first lens array 21 can be changed as appropriate. For example, the first lens portions 211 and the like may be arranged in a form of a regular triangle lattice.

If the first lens portions 211 constituting the unit UT are placed at the vertices of a regular polygon such as a square or regular triangle, the regular polygon may not technically be a regular polygon but may include a slight error. In other words, in the description, even if there are variations in the lengths of the sides of a polygon related to the placement of the lenses constituting the unit, as long as they are within tolerances of the optical performance required for the lens array optical system, it is assumed to be a regular polygon.

Moreover, in the above embodiments, two or three lens arrays are stacked. However, only one lens array may be used as the lens array optical system 20. In this case, it is preferable to place, on the object side, the first flange surface 21*e* side where the groove portion 21*g* is formed.

The first lens array 21, the second lens array 22, and the like are not limited to those produced by a similar method and having a similar structure. For example, the second lens array 22 can have a structure or shape that is not provided with the groove portions 21*g*, 22*g*, and 23*g* as in the first lens array 21.

Moreover, in the above embodiments, the partition plate 72*b* is used as the member for dividing the molten glass drop GD of the dividing member 72. However, a wire may be used to form a cross shape. Moreover, the shape of the partition plate 72*b* can be changed by the placement of the first lens portions 211 and the like that constitute the unit UT, as appropriate.

Moreover, in the above embodiments, it is preferable that the first optical transfer surface 61*f* of the first forming die 61 have a concave shape. However, the second optical transfer surface 62*f* of the second forming die 62 may have a concave or convex shape. Moreover, the first to fourth optical surfaces 21*c*, 21*d*, 22*c*, and 22*d* have an aspheric shape. However, their shape is not limited to the aspheric shape. It is simply required to adopt an optimum shape as appropriate in accordance with required performance and application.

Moreover, in the above embodiments, the imaging device array 50 where the imaging units 50*a* are arranged two-dimensionally is used. However, the arrangement is not limited to the array form. One with imaging devices all over the surface may be provided.

The invention claimed is:

1. A method for manufacturing a lens array optical system, comprising:
    simultaneously dropping divided glass droplets, the divided glass droplets being obtained by dividing drop-shaped molten glass into a plurality of droplets, toward a center portion of a regular polygon of each unit on a first transfer surface of a first forming die where a plurality of the units is regularly arranged along the same plane, and each unit comprises three or more first optical transfer surfaces for forming a lens portion placed in such a manner as to overlap vertices of the regular polygon respectively;
    wherein the divided glass droplets flow towards each other on the first transfer surface to directly connect to each other between adjacent units, forming united glass,
    before the united glass hardens completely, pressing a second forming die including a plurality of second optical transfer surfaces corresponding respectively to the plurality of first optical transfer surfaces, relatively against the united glass that has not hardened completely, on the first forming die to further form the united glass; and
    obtaining a lens array including an integral glass part having a plurality of lens portions by releasing the lens array from the first and second forming dies.

2. The method for manufacturing a lens array optical system according to claim 1, wherein the plurality of the units is arranged in a lattice form.

3. The method for manufacturing a lens array optical system according to claim 2, wherein:
    the plurality of first optical transfer surfaces is arranged in a rectangular lattice form, and
    the regular polygon is a square.

4. The method for manufacturing a lens array optical system according to claim 2, wherein the drop-shaped molten glass is dropped in a dividing member including a plurality of openings to obtain the divided glass droplets obtained by dividing the drop-shaped molten glass into the plurality of droplets.

5. The method for manufacturing a lens array optical system according to claim 2, wherein at least one lens portion located on the outermost periphery of the lens array is removed by cutting.

6. The method for manufacturing a lens array optical system according to claim 1, wherein:
    the plurality of first optical transfer surfaces is arranged in a rectangular lattice form, and
    the regular polygon is a square.

7. The method for manufacturing a lens array optical system according to claim 6, wherein the drop-shaped molten glass is dropped in a dividing member including a plurality of openings to obtain the divided glass droplets obtained by dividing the drop-shaped molten glass into the plurality of droplets.

8. The method for manufacturing a lens array optical system according to claim 6, wherein at least one lens portion located on the outermost periphery of the lens array is removed by cutting.

9. The method for manufacturing a lens array optical system according to claim 1, wherein the drop-shaped molten glass is dropped in a dividing member including a plurality of openings to obtain the divided glass droplets obtained by dividing the drop-shaped molten glass into the plurality of droplets.

10. The method for manufacturing a lens array optical system according to claim 9, wherein the dividing member includes an outer frame in a lower part of the opening.

11. The method for manufacturing a lens array optical system according to claim 1, wherein at least one lens portion located on the outermost periphery of the lens array is removed by cutting.

12. A lens array optical system comprising:
    an integral glass part including a plurality of lens portions and two principal surfaces;
    a plurality of units arranged regularly along the same plane, wherein each unit comprises three or more lens portions placed in such a manner as to overlap vertices of a regular polygon respectively; and
    a groove portion on one of the principal surfaces between adjacent lens portions of a pair of adjacent units among the plurality of units, the groove portion having a maximum width between adjacent lens portions across the groove portion,
    wherein the maximum width of the groove portion is greater than or equal to 0.3 times a distance between the adjacent lens portions across the groove portion and less than or equal to 0.7 times the distance between the adjacent lens portions across the groove portion.

13. The lens array optical system according to claim 12, wherein the groove portion has a maximum depth greater than or equal to $\frac{1}{50}$ of a thickness between a pair of adjacent lens portions not across the groove portion and less than or equal to $\frac{1}{5}$ of a thickness between the pair of adjacent lens portions not across the groove portion.

14. The lens array optical system according to claim 12, wherein the plurality of units is arranged in a lattice form.

15. The lens array optical system according to claim 12, wherein:
the plurality of lens portions is arranged in a rectangular lattice form, and
the regular polygon is a square.

16. The lens array optical system according to claim 12, further comprising a plurality of additional lens portions formed outside the plurality of units.

17. The lens array optical system according to claim 12, wherein the groove portion is placed on the principal surface on an object side.

18. A lens array optical system comprising a plurality of lens arrays stacked in an optical axis direction, wherein at least one of the plurality of lens arrays is the lens array according to claim 12.

19. The lens array optical system according to claim 18, wherein the at least one lens array is provided with the groove portion on the principal surface on a side facing another lens array.

20. The lens array optical system according to claim 12, wherein each unit includes a plurality of lens body portions and a flange portion arranged around the lens body portions.

21. The lens array optical system according to claim 12, wherein a width of the groove at a center portion of the lens optical system is larger than a width of the groove at ends of the groove.

* * * * *